United States Patent
Labarbera et al.

(10) Patent No.: US 12,311,906 B2
(45) Date of Patent: May 27, 2025

(54) SYSTEM AND METHOD OF PREEMPTIVELY READYING A BRAKE SYSTEM

(71) Applicants: Steering Solutions IP Holding Corporation, Auburn Hills, MI (US); Continental Automotive Systems, Inc., Auburn Hills, MI (US)

(72) Inventors: Joseph A. Labarbera, Birch Run, MI (US); Clinton L. Schumann, Holly, MI (US); Scott T. Sanford, Swartz Creek, MI (US); Michael Wyciechowski, Grand Blanc, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 356 days.

(21) Appl. No.: 17/504,373

(22) Filed: Oct. 18, 2021

(65) Prior Publication Data

US 2023/0119160 A1    Apr. 20, 2023

(51) Int. Cl.
*B60T 8/92*    (2006.01)
*B60T 8/88*    (2006.01)

(52) U.S. Cl.
CPC ............... *B60T 8/92* (2013.01); *B60T 8/885* (2013.01); *B60T 2260/02* (2013.01); *B60T 2270/413* (2013.01)

(58) Field of Classification Search
CPC ... B60T 8/88; B60T 8/885; B60T 8/92; B60T 8/1755; B60T 2201/16; B60T 2210/20; B60T 2210/22; B60T 2210/24; B60T 2510/30; B60T 2552/30; B60T 2270/402; B60T 2270/86; B60T 2270/06
See application file for complete search history.

(56) References Cited

U.S. PATENT DOCUMENTS

| 10,046,743 B2 | 8/2018 | Jonasson et al. |
| 10,046,749 B2 | 8/2018 | Jonasson et al. |
| 2016/0001781 A1* | 1/2016 | Fung ........................ G07C 9/37 701/36 |
| 2016/0132055 A1* | 5/2016 | Matsuno ............. B60W 10/184 701/23 |
| 2017/0341658 A1* | 11/2017 | Fung ....................... G06V 40/45 |

FOREIGN PATENT DOCUMENTS

| CN | 101035700 A | 9/2007 |
| CN | 105073474 A | 11/2015 |
| CN | 106125722 A | 11/2016 |
| DE | 60315766 T2 | 1/2008 |

(Continued)

OTHER PUBLICATIONS

German Office Action dated Oct. 10, 2022; Application No. 10 2022 102 339.7; Applicant: Continental Automotive Systems, Inc et al; 13 pages.

(Continued)

*Primary Examiner* — Hai H Huynh
*Assistant Examiner* — Johnny H Hoang
(74) *Attorney, Agent, or Firm* — Lorenz & Kopf LLP

(57) ABSTRACT

A number of variations may include a method including pre-charging at least a portion of a vehicle brake system.

8 Claims, 4 Drawing Sheets

(56) References Cited

FOREIGN PATENT DOCUMENTS

| | | |
|---|---|---|
| DE | 102012211901 A1 | 1/2014 |
| DE | 102013113685 A1 | 11/2014 |
| DE | 102013217136 A1 | 3/2015 |
| DE | 102014200608 A1 | 7/2015 |
| DE | 102014217445 A1 | 3/2016 |
| DE | 102015112755 A1 | 2/2017 |
| DE | 102017221289 A1 | 5/2019 |
| DE | 102019129032 A1 | 4/2021 |

OTHER PUBLICATIONS

CN Office action dated Feb. 22, 2025 for CN application No. 202111505481.8.

* cited by examiner

SYSTEM AND METHOD OF PREEMPTIVELY READYING A BRAKE SYSTEM

TECHNICAL FIELD

The field to which the disclosure generally relates to includes steering, braking, and propulsion systems.

BACKGROUND

Vehicles typically include steering systems including electronic power steering systems.

SUMMARY OF ILLUSTRATIVE VARIATIONS

A number of variations may include a method including pre-charging at least a portion of a vehicle brake system.

A number of variations may include a method including pre-charging at least a portion of a vehicle brake system when a component of a vehicle steering system is at risk of failing or is failing but has not completely failed.

A number of variations may include a method including pre-charging at least a portion of a vehicle brake system in response to a determination there is a probability of vehicle component failing in the future.

A number of variations may include a method including pre-charging at least a portion of a vehicle brake system in response to a determination made by a controller there is a probability driving condition may occur in the future.

A number of illustrative variations may include a method of pre-emptively readying a brake system based upon a potential steering failure, the method including monitoring the state of health of a steering system using one or more sensors, and wherein the state of health of the steering system ranges from completely healthy to complete failure, and determining if the state of health of the steering system is less than completely healthy, or at risk of partial or complete failure, and if the state of the steering system is less than completely healthy, or at risk of partial or complete failure, then pre-charging the braking system to reduce hysteresis or lag time to apply brake force or brake torque to a brake disc or drum connected to a wheel of the vehicle.

The number of illustrative variations may include a method of pre-emptively readying a brake system based on the potential failure of a steering system power assist, the method including determining the state of health of the steering system power assist using one or more sensors, the power assist being constructed and arranged to rotate a steering shaft or move a roadwheel actuator operatively connected directly or indirectly to a driver interface to assist the driver in steering the vehicle using the driver interface with less torque then if the power assist were not present, based on the determined the state of health of the steering system power assist determining if the steering system power assist is at risk of failure, and if the steering system power assist is at risk of failure then pre-charging at least one vehicle wheel brake, the pre-charging including moving at least one brake pad from a resting first position spaced a first distance from a brake disc or brake drum to a second position wherein the brake pad is at a closer position to the brake disc or brake drum than the first position, or the brake pad is engaging the brake disc or brake drum, and thereafter determining if the steering system power assist has failed, and if the steering system power assist has failed using the at least one brake pad to apply a sufficient braking force to the brake disc or brake drum to reduce the torque the driver would have to use to steer the vehicle when the power assist has failed and the sufficient braking force has not been applied.

A number of illustrative variations may include a system and method of using vehicle brakes to steer a vehicle where steering systems have failed. The system may include supplying varying brake force or torque, as needed, to different vehicle wheels to steer the vehicle. The system may include supplying propulsion system commands to maintain vehicle speed or acceleration such that in the event of steering system failure, a vehicle may continue to operate safely without effecting driver input.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
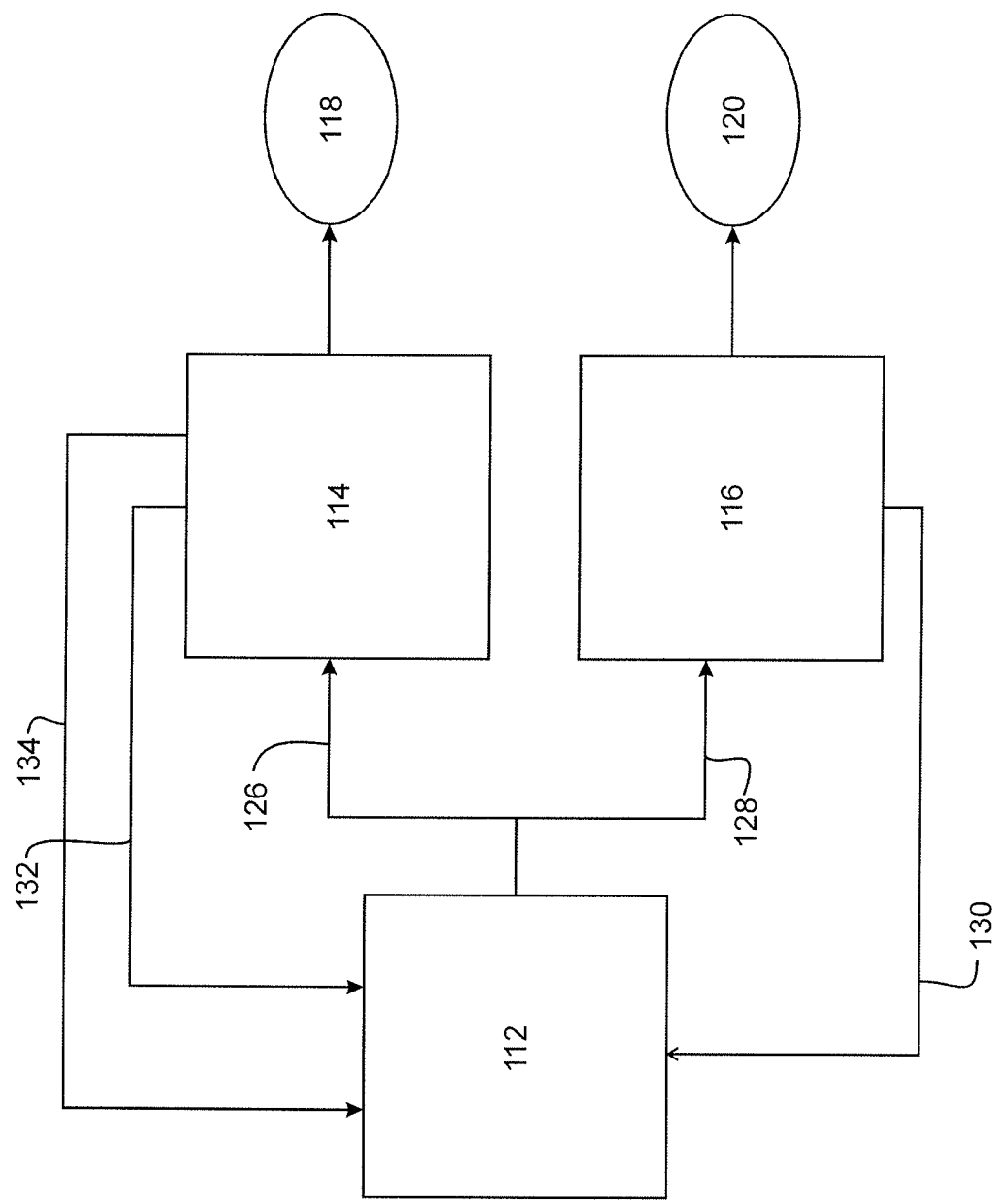
FIG. 1 depicts an illustrative variation of a block diagram of a system and method of brake-to-steer as steering system assist or steering system failure fallback.

The following description of the variations is merely illustrative in nature and is in no way intended to limit the scope of the invention, its application, or uses.

A number of variations may include a method including pre-charging at least a portion of a vehicle brake system. A method including pre-charging at least a portion of a vehicle brake system may be utilized in a vehicle having a steering system having a mechanical linkage to steered roadwheels, in a steering-by-wire system, or any other steering system. A method including pre-charging at least a portion of a vehicle brake system may be utilized in a vehicle constructed and arranged to be manually driven by a person, a vehicle having semi-autonomous or completely autonomous driving capability A number of variations may include a method including pre-charging at least a portion of a vehicle brake system when a component of a vehicle steering system is at risk of failing or is failing but has not completely failed. A method including pre-charging at least a portion of a vehicle brake system when a component of vehicle steering system is at risk of failing or is failing but has not completely failed may be utilized in any vehicle with component in the steering system which can fail including, but not limited to a steering system with a mechanical linkage to steered wheels or wheel, steer-by-wire system, or any other steering system.

In a number of illustrative variations, a vehicle steering system may provide an early warning to a brake system when there is a high potential that a component in the steering system is going to have failure in the near future. The brake system may then pre-charge at least one brake to take out any hysteresis in the system or reduce the lag time in applying sufficient force to at least one brake disc or brake drum in the event of a failure of of a component in the steering system. The brake system within be able to react quicker when the full failure of a component in the steering system occurs. Upon Failure of a component in the steering system, the brake system may supply differential braking and make the loss of steering assist less of a concern to the driver. The early warning would also make the communication between different vehicle systems and components more robust. This may be helpful in mitigating the severity of full failure events, which may be much higher in brake force or torque then the early pre-emptive pre-charge events.

One of the concerns for a power assisted steering system as the loss of assist during catastrophic failures. When a loss of assist (LOA) event occurs, the driver is still connected to the steered wheels via mechanical linkage and must input significantly higher effort in the hand wheel or steering interface to steer the vehicle. If a loss of assist event occurs while the tires are turning the tire aligning forces will try to steer the tires to a straight position. Assuming the vehicle's tires are turned during the onset of a loss of assist event, torque that is supplied by the power steering system must be instantly supplied by the driver via the steering wheel (or steering interface) or the vehicle's steering angle will decrease. The vehicle speed and suspension settings, like the amount of caster, also influences how hard/fast the steered wheels want to return to center (0 angle relative to the vehicle). During the onset of loss of assist event there is a torque spike felt by the driver, as the driver attempts to maintain the steering angle. An electronic braking system may provide differential braking in such a scenario. This is braking on one side of the vehicle to provide a steering like phenomenon and dampen the loss of assist torque spike in the steering wheel or steering interface operated by the driver. Using an early warning from the steering system will allow the brake system to react faster when the final failure occurs.

Currently, the main way that a steering system mitigates the loss of assist is through lowering the occurrence of the loss of assist events. This is achieved by using expensive redundant methods, such as having two electronic control units within the steering system. If one of the electronic control systems were to fail, the other electronic control unit would keep a high level of steering assistance. Communication between the steering and brake modules, then using differential braking may help reduce the need for expensive redundancies.

A number of variations, when a failure of one or more components in the steering system occurs, a signal multiple times or multiple signals from the steering system may confirm the failure. Such may reduce the chance of faults flags, especially relative to a single one time message that a failure is occurring.

When brakes are used to supplement the lateral control of a vehicle, the differential braking can slow the vehicle. An electronic brake system may request increase engine or motor torque to compensate for vehicle deceleration. The brake system to engine or motor interface is a generally installed interface. Furthermore, early transmission gear downshifts may be utilized. So, with the early warning from the steering system, the brake system may direct the transmission to an appropriate gear. A brake system to transmission interface may be provided in the vehicle.

The following is a sequence of events that may occur. First, the driver is driving a vehicle with a normally functioning steering system. The vehicle is traveling on a curved road. Second, the steering system has an internal component failure. The steering system communicates to the electronic brake system that the component is failing, and loss of steering assist is imminent. Third, the brake system prepares to support the steering system and builds a small amount of brake force or torque. This small amount of brake force or torque pre-charges the calipers but it's not enough to provide distinguishable deceleration to a normal driver. The transmission is requested to downshift. Fourth, the steering system then communicates it is non-operational. The brake system then quickly builds the appropriate brake force or torque on the appropriate wheels. In this case, brake force or torque is applied to the calipers on the inside of the curve with the amount based upon the steering wheel (steering) angle or the last known steering angle. The brake system also requests additional engine or motor torque to supplement the brake torque used to help steer the vehicle. The driver continues to steer the vehicle now manually and the brake system supplies brake force or torque to help steer the vehicle.

In a number of illustrative variations, a vehicle may comprise a steering system. In such cases, the steering system may be manually operable by the driver via a steering interface, autonomously operable by an autonomous steering system, or operable as a combination of autonomous and manual steering wherein the steering system is configured to receive and interpret steering input from a driver, the autonomous steering system, or both at the same time.

In a number of illustrative variations, a steering interface may comprise a handwheel, a joystick, a trackball, a slider, a throttle, a pushbutton, a toggle switch, a lever, a touchscreen, a mouse, or any other known means of user input.

In a number of illustrative variations, a vehicle may comprise a steering system comprising a steering interface and a steerable propulsion system such as but not limited to a steering wheel and road wheels, respectively. The steering system may be of a mechanical linkage or steer-by-wire type wherein physical mechanisms do not mechanically communicate a manipulation of the steering interface to the steerable propulsion system and wherein a manipulation of the steering interface affects an associated manipulation of the steerable propulsion system via the communication of electronic devices such as but not limited to sensors, transceivers, and electronically excited actuators. According to some variations, a steer-by-wire system may include at least one road wheel actuator and at least one a handwheel actuator in operable communication with one another via a steer-by-wire system or controller. The steer-by-wire system may include a road wheel actuator system in operable communication with a hand wheel actuator system wherein rotation of the steering wheel or handwheel of a vehicle translates to actuation of the road wheel actuator system such that a vehicle wheel may be turned.

The handwheel actuator assembly may include a steering wheel, a handwheel actuator, such as an electronic motor, and a hand wheel angle sensor. The handwheel actuator assembly may be constructed and arranged communicate handwheel angle and position to the road wheel actuator assembly including at least one steering actuator constructed and arranged to pivot or turn a road wheel.

In a number of illustrative variations, a vehicle may include electronic braking system constructed and arranged to apply brake force or torque to any number of road wheels to slow or stop a vehicle based upon driver handwheel input. The electronic braking system may be in operable communication with the steering system, hand wheel actuator assembly, and road wheel actuator assembly via at least one controller. The controller may implement any number of systems, including algorithms, for monitoring and controlling propulsion, steering, and braking. According to some variations, the electronic braking system may be utilized to apply differential brake force or torque to a number of wheels to effectuate lateral motion of the vehicle where a portion of a steering system has failed, such as an operable disconnect between the wheel actuator assembly and the roadwheel actuator assembly.

In a number of illustrative variations, a brake-to-steer system may utilize a brake-to-steer algorithm that may communicate brake force or torque requests to individual wheels as a function of driver steering inputs including steering angle, steering angle rate, and steering torque. The brake-to-steer algorithm may communicate brake force or torque requests when the system has detected a power steering assist or a road wheel actuator failure or shut down leading to no output capable of a steering rack or roadwheel actuator. Alternatively, the brake-to-steer algorithm may communicate brake force or torque requests when the system has detected wheel actuator failure or shut down.

Upon detection of roadwheel actuator or handwheel actuator failure, the system may generate a visual or audio cue to a driver via a human to machine interface integrated into the vehicle. As a non-limiting example, the system may indicate via lamps or alarms that the steer-by-wire or a portion of the steer-by-wire system has failed. Driver input into the handwheel in the form of steering signals may include steering wheel angle, steering wheel rate, and steering torque may be communicated to a brake-to-steer driver directional controller. The brake-to-steer algorithm may receive said steering signals and calculate brake force or torque requests as a function steering signals to an electronic braking system electronic control unit. An electronic braking system may provide a yaw response to driver input of steering signals. In some cases, the system may provide for control of a vehicles propulsion system and may adjust throttle, speed, acceleration, and the like as needed to maintain driving speed while the brake-to-steer system is operating. In some cases, the system may control a vehicles propulsion system to facilitate gradual slowing of a vehicle while the brake-to-steer system is operating.

According to some variations, a brake-to-steer system may be controlled by an external domain controller constructed and arranged to employ brake-to-steer functionality where a steer-by-wire system, including handwheel actuators and roadwheel actuators, loses power or fails entirely.

According to some variations, the brake-to-steer system may function by converting steering requests into a desired yaw rate which may then be converted into a corresponding brake force or torque applied to the vehicle brakes in order to create the desired yaw rate. Brake force or torque may be applied to vehicle brakes via an electronic braking system. Brake force or torque may be applied to individual brake calipers as required to effectuate the desired yaw rate. The system may be constructed and arranged to also implement driver, or autonomous or virtual driver acceleration and deceleration requests as required.

Converting steering requests to actual yaw rate, and the conversion from your rate to brake force or torque may be accomplished via calculation or look up tables. Similarly, converting steering angle to the appropriate brake force or torques may also be accomplished via calculation or look up table. According to some variations, where an autonomous driving system or virtual driver system is implemented within a vehicle, calculated brake force or torque s may be communicated to the autonomous or virtual system such that the system may compensate for the brake-to-steer functionality.

According to some variations, the brake-to-steer system may continuously monitor vehicle speed, yaw rate, and lateral acceleration and may broadcast the availability of the brake-to-steer functionality to various other systems within the vehicle such that, if needed, brake-to-steer functionality may be implemented readily. According to some variations, the availability of the brake-to-steer system may include factoring in vehicle velocity data to determine the availability of the brake-to-steer system.

Figure 2:
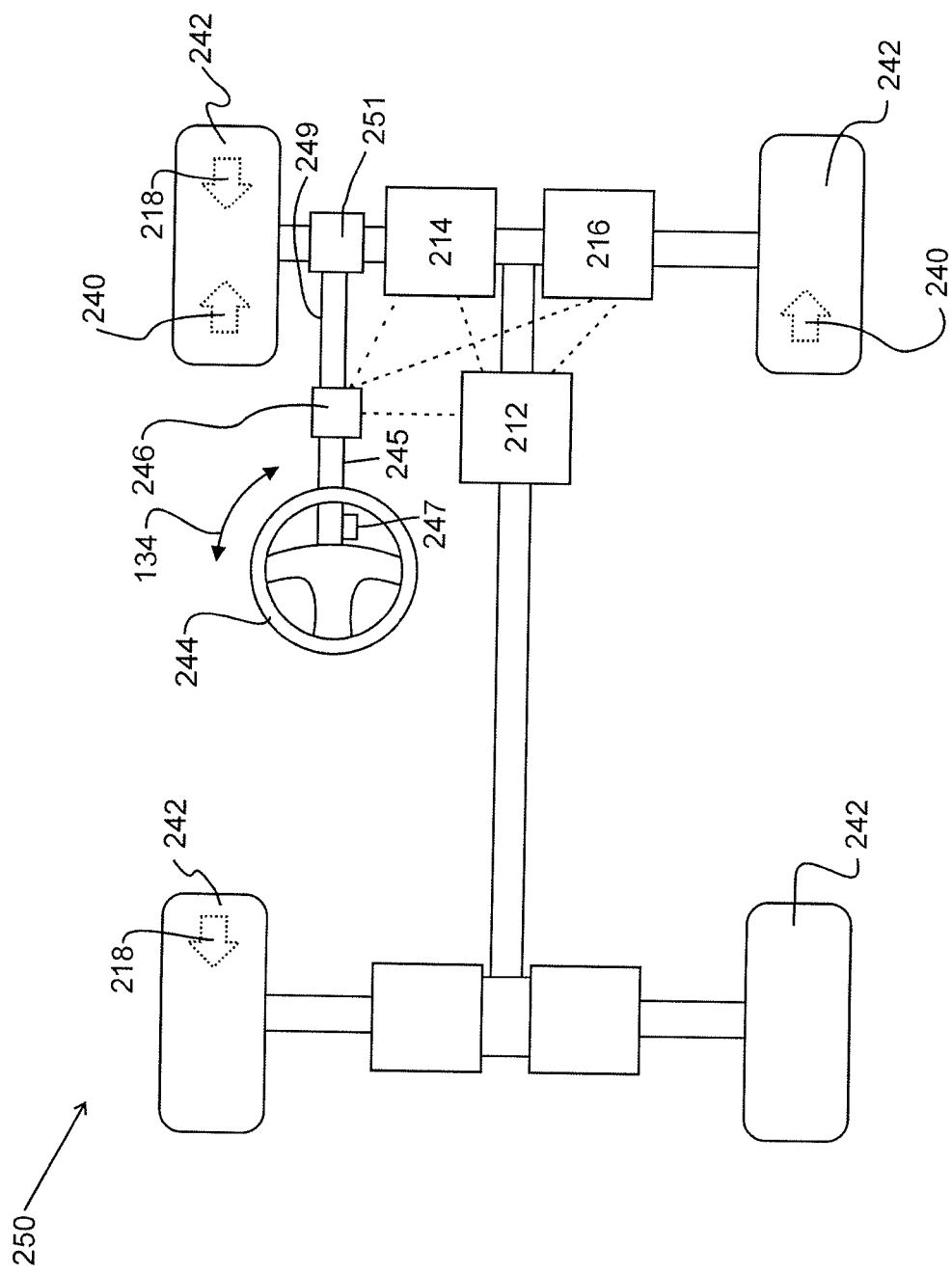
FIG. 2 depicts an illustrative variation of a vehicle equipped with hardware sufficient for carrying out at least some of the systems and methods described herein.

FIG. 1 depicts an illustrative variation of block diagram of a system and method of brake-to-steer as brake pre-charging and steering system failure fallback. A vehicle may include a controller 112 constructed and arranged to receive driver steering input 134 via a steering 114. The controller 112 may additionally be constructed and arranged to provide steering actuator commands 126 to the steering system 114. The steering system 114 may output tire angle changes 118 to affect steering and steer-by-wire system health status 132 to the controller 112. The controller 112 may also be constructed and arranged to provide braking commands 128 to an electronic braking system 116 which, in turn, may apply brake force or torque 120 to individual brake calipers. Where the steering system 114 has indicated to the controller 112 that steer-by-wire system health status 132 is at risk of failing, is failing, the steering system 114 is partially available or not available, the controller 112 may send a brake movement request to pre-charge a brake. If the steering system indicates that a component of the steering system, such as but not limited to a power steering assist or a roadwheel actuator, the controller 112 may receive driver input 134 via a steering wheel and convert steering requests into brake force or torque requests or commands 128 to be communicated to the electronic braking system 116. FIGS. 1-2 are simply illustrative. The functionality of the controller(s) may be carried out by one or more controllers situated anywhere in the vehicle. One or more algorithms may be used and executed by one or more electronic processors to accomplish the methods, actions and functionality described herein.

FIG. 2 depicts an illustrative variation of portions of a vehicle equipped with hardware sufficient for carrying out at least some of the systems and methods described herein. A vehicle 250 may include a controller 212 constructed and arranged to provide brake-to-steer functionality in a vehicle 250. The controller 212 may be in operable communication with a steering system 214 and an electronic braking system 216. The steering system 214 and an electronic braking system 216 may be in operable communication with at least one road wheel 242. A driver may utilize a handwheel 244 to provide driver input 134 for lateral movement and send steering requests to the steering system 214. In some variations, a steering assist or wheel actuator 246 associated with the steering interface 244 may be in operable communication with the controller 212, the steering system 214, or the electronic braking system 216. In some variations, the steering assist or handwheel actuator 246 may be disconnected or in a failure state 248 from or unable to communicate with the steering system 214 or a roadwheel actuator 251 as part of the steering system 214. In such a variation, the steering sensor 247 may communicate steering requests to the controller 212, which may receive steering system 214 health status information. Where the controller 212 has received steering system 214 health status information indicative of a component, such as a steering assist 246 or a roadwheel actuator 251 has failed, the controller 212 may convert steering requests from the steering senor 247 to brake force or brake torque requests to be communicated to the electronic braking system 216. The electronic braking system 216 may apply brake force or brake torque 218 to determined appropriate roadwheels 242 to effectuate lateral movement of the vehicle as input 134 by the driver via the handwheel 244. The controller 212 may also be constructed and arranged to make speed and acceleration requests 240 to an propulsion system onboard such that the vehicle may maintain or modify speed or acceleration during brake-to-steer functionality.

Figure 3:
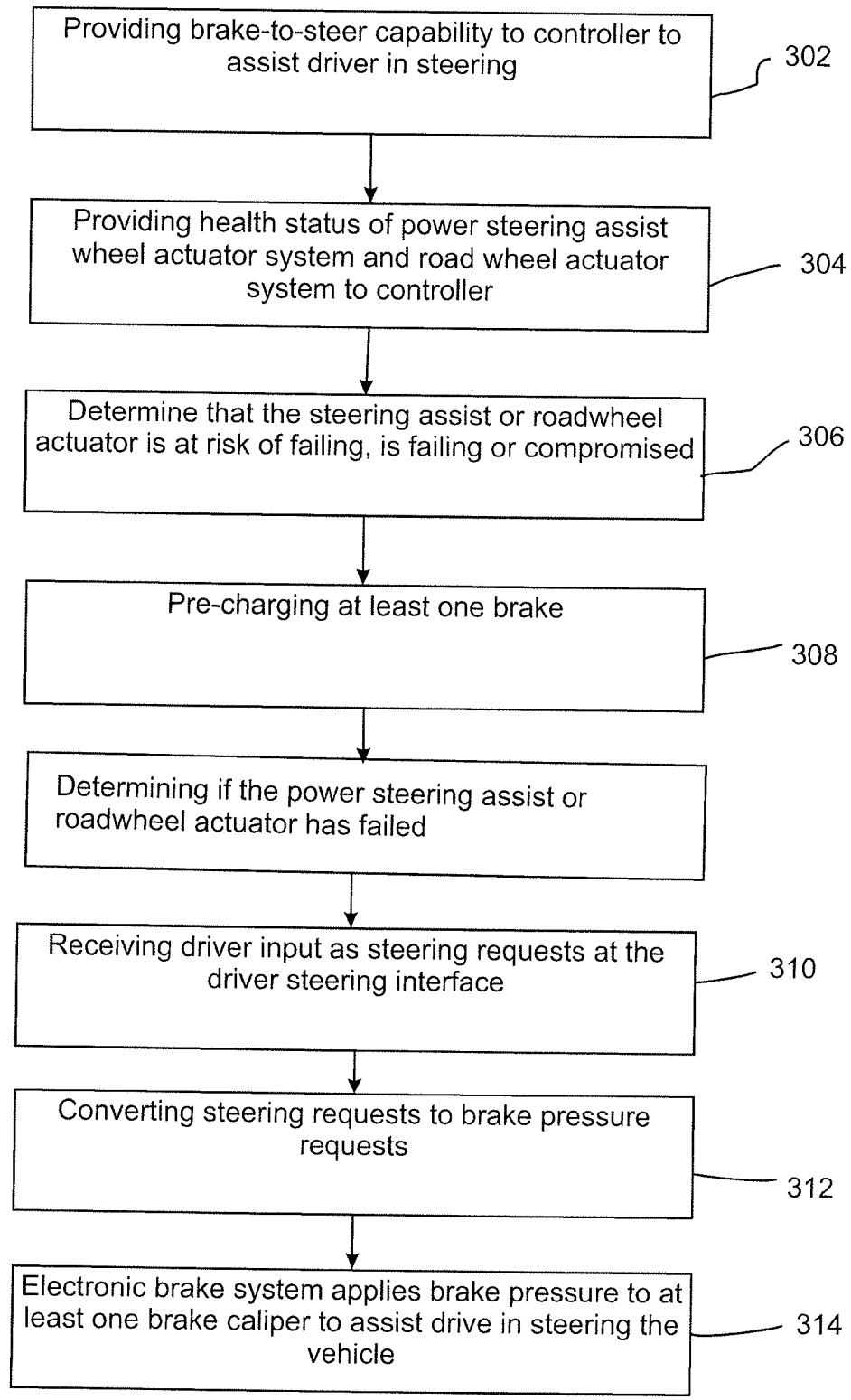
FIG. 3 depicts an illustrative variation of a system or method including pre-charging a brake system.

FIG. 3 depicts a simplified flowchart of an illustrative variation of a system for using brake pre-charging and brake-to-steer functionality as a Steering assist and steering failure fallback. The system may routinely or approximately continuously provide brake-to-steer capability to a controller 302 indicating readiness of the brake-to-steer functionality. At point 304, the steering system health status, including steering assist or roadwheel actuator system health statuses, may be communicated to the motion controller. In some instances, the health status may indicate that portions of the steering system are at risk of failing, failing, are malfunctioning or not operable. At point 306, the controller may receive the steering system health status and determine that the steering system is at risk of failing, failing or at least partially compromised. At point 308, then pre-charging of at least one brake is performed. At point 310, the controller may receive the steering system health status and determine that a component of the steering system has failed. The controller may then implement the brake-to-steer capability including receiving steering requests from the steering sensor via driver input at the handwheel 314. At point 316, the system may convert steering requests to brake force or brake torque requests. Alternatively, the system may convert steering requests to vehicle yaw rate requests and convert yaw rate requests to brake force or brake torque requests. At point 318, the electronic brake system may receive brake force or brake torque requests and apply brake force or brake torque to individual brake calipers on a vehicle in order to assist in steering or to steer the vehicle.

In a number of variations, the steering power assist can be in any suitable form including, but not limited to, electric, hydraulic, pneumatic, magnetic. Electric power steering (EPS) is on many vehicles. There's still a solid metal steering shaft running from the steering wheel to the steering rack, which steers the tires, but the rest is high-tech. EPS uses an electric motor that draws energy from the vehicle's electrical system to provide the steering assistance. This electric motor can be located either coupled to the steering shaft or roadwheel actuator. Sensors detect the torque, or effort, that the driver is applying at the steering wheel, and a computer decides how much assist needs to be added. In most systems, the computer changes the steering effort based on the vehicle's speed: at parking speeds, the steering is light and easy to turn, while at highway speeds, the effort amps up, giving the driver a feeling of greater stability and control.

Figure 5:
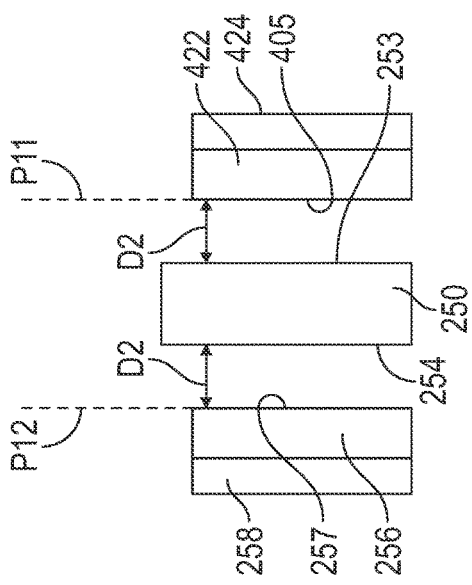
FIG. 5 is an enlarged, partial, sectional view of brake assembly with brake pad in a second position as a result of pre-changing the brake according to a number of variations.
Figure 6:
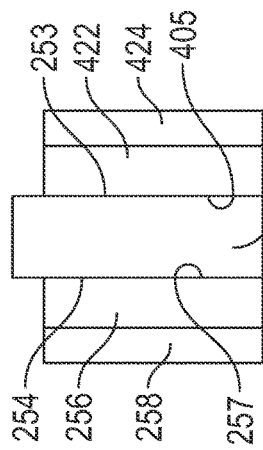
FIG. 6 is an enlarged, partial, sectional view of brake assembly with brake pad in a second position wherein the brake pads engage a brake disc as a result of pre-changing the brake according to a number of variations.
Figure 4:
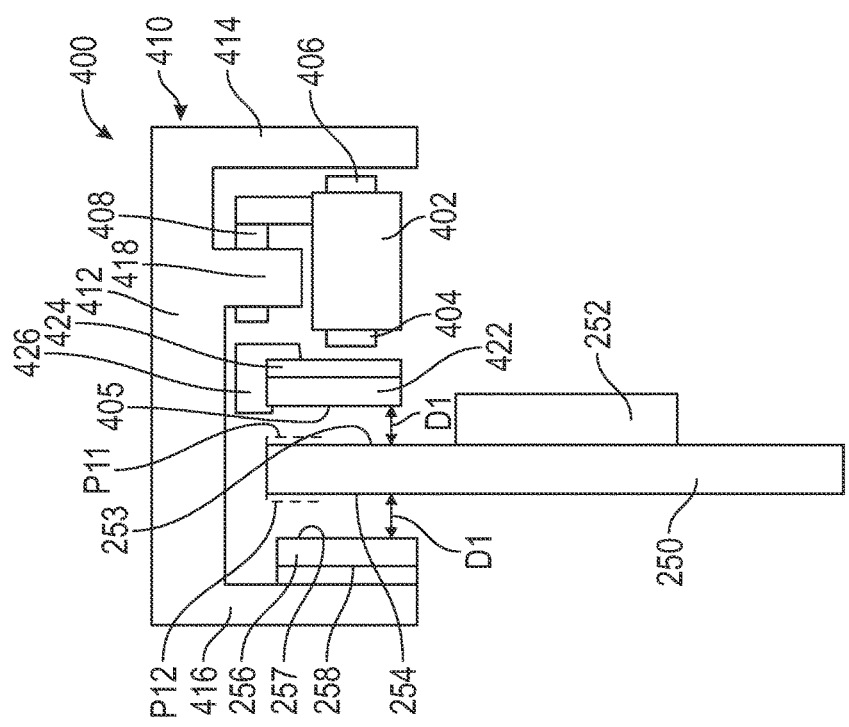
FIG. 4 is a sectional view of brake assembly with brake pads in a resting first position according to a number of variations.

FIGS. 4-6 illustrate a brake actuator assembly and method that may be used in a number of variations. A system and method my include a brake actuator assembly 400 having an actuator 402 that may be electric, hydraulic, pneumatic or other means of operation. The actuator 402 may include a piston system including a first portion 404 and an opposite second portion 406 wherein each may be movable in an axial direction. A pin 408 may be connected to the actuator 402. A 410 caliper may have first flange 414, second flange 416, and third flange 418. The caliper 410 may slide on the pin 408. A first brake pad 422 may be supported by a first brake plate 424 connected to a support 426. The first brake pad 422 and plate 424 may slide on the support 426. A second brake pad 256 may be supported on a second brake pad plate 258, which may be connected to the third flange 416. The first brake pad 404 may move toward a first face 253 of a brake disc 250. The brake disc 250 may be supported by a rotor 252. The second brake pad 256 may move toward a second face 254 of the brake disc 250. When the steering system communicates that a component is failing or is at risk of failing but has not yet failed, then the actuator 402 may move the first piston portion 404 and the second piston portion 406 in opposite axial directions so that the first piston portion 404 moves the first brake pad 422 from a resting first position spaced a first distance D1 from the first face 253 of the brake disc 250 to a second position wherein the engagement face 405 of the first brake pad 422 is at a distance that is spaced from the first face 253 of the brake disc 250 or where in the first brake pad 422 engages the first face 253 of the brake disc 250. For example, the first brake pad 422 may be move so that the engagement face 405 aligns with plane P11. The actuator 402 causes the second piston portion 406 to engage the first flange 414 of the caliper 410 to draw the second brake pad 256 from a resting first position wherein the engagement surface 257 of the second disc pad 256 is a distance D2 from the second face 254 of the brake disc 250 to a second position wherein the engagement face 257 of the second brake pad 256 is spaced from the second face 254 of the brake disc or engages the brake disc 250. For example, the second brake pad 256 may be move so that the engagement face 257 thereof is aligned with line P12. As shown in FIG. 5, when the first brake pad 422 is moved so that the engagement face 405 thereof is aligned with plane P11 the engagement face is spaced a distance D2 from the first face of the brake disc 253. And when the second brake pad 256 is move so that the engagement face thereof aligns with plane P12 the engagement face of the second brake pad 256 space state distance D2 from the second face 254 of the brake disc 250. Distance D2 is less than distance D1 shown in FIGS. 4-5. FIG. 6 illustrates pre-charging the brake system so that the engagement face 405 of the first brake pad for 422 engages the first face 253 of the brake disc 250 and wherein the engagement face 257 of the second brake pad 256 engages the second face 254 of the brake disc 250.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

Variation 1 may include a method comprising pre-charging at least a portion of a vehicle brake system when a component of a vehicle is at risk of failing or is failing but has not completely failed.

Variation 2 may include a method comprising pre-charging at least a portion of a vehicle brake system in response to a determination there is a probability of vehicle component failing in the future.

Variation 3 may include a method comprising pre-charging at least a portion of a vehicle brake system in response to a determination there is a probability driving condition may occur in the future.

Variation 4 may include a method of pre-emptively readying a brake system based upon a potential steering failure, the method comprising monitoring the state of health of a steering system using one or more sensors, and wherein the state of health of the steering system ranges from completely healthy to complete failure, and determining if the state of health of the steering system is less than completely healthy, or at risk of partial or complete failure, and if the state of the steering system is less than completely healthy, or at risk of partial or complete failure, then pre-charging the braking system to reduce hysteresis or lag time to apply braking force or brake torque to a brake disc or drum connected to a wheel of the vehicle.

Variation 5 may include a method of pre-emptively readying a brake system based on the potential failure of a steering system power assist, the method comprising determining the state of health of the steering system power assist using one or more sensors, the power assist being constructed and arranged to rotate a steering shaft connected to a driver interface to assist the driver in steering the vehicle using the driver interface with less torque then if the power assist were not present, based on the determined the state of health of the steering system power assist determining if the steering system power assist is at risk of failure, and if the steering system power assist is at risk of failure then pre-charging at least one vehicle wheel brake, the pre-charging including moving at least one brake pad from a first position spaced a first distance from a brake disc or brake drum to a second position wherein the brake pad is at a closer position to the brake disc or brake drum than the first position, or the brake pad is engaging the brake disc or brake drum, and thereafter determining if the steering system power assist has failed, and if the steering system power assist has failed using the at least one brake pad to apply a sufficient braking force to the brake disc or brake drum to reduce the torque the driver would have to use to steer the vehicle when the power assist has failed and the sufficient braking force has not been applied.

Variation 6 may include a method comprising:
monitoring a vehicle steering system to using at least one senor, and determining if a component of the steering system is at risk of failing or had failed; if there is a determination that a component of the steering system is failing then causing the steering system to communicate to the electronic brake system that the steering system component is failing: the brake system thereafter preparing to support the steering system by building a first amount of brake force or brake torque of a brake disc or brake drum of the vehicle using a first brake caliper, wherein the amount of brake force or brake torque pre-charges the first caliper but it's not enough to provide distinguishable deceleration to a normal driver; requesting a vehicle transmission to downshift; thereafter if the is a determination that a component of the steering system has failed, the steering system then communicating that a component of the steering system has failed, in response to the communication that a steering system component has failed the brake system building a second amount of brake force or brake torque on the brake disc or brake drum.

Variation 7 may include a method as set forth in variation 6 wherein the component is a steering system power assist.

Variation 8 may include a method as set forth in variation 6 wherein the component is a roadwheel actuator.

Variation 9 may include a method as set forth in variation 6 further comprising determining if the vehicle is moving along a curved path at the time of the steering system communicates to the brake system that a component of the steering system has failed and if the vehicle is determined to be traveling on a curved path then applied the second amount of brake force or brake torque is applied to the disc brake or brake drum of a vehicle a wheel on the inside of the curve path with the amount based upon the steering real angle or the last known angle.

Variation 10 may include a method as set forth in variation 6 further comprising the brake system requesting additional engine or motor torque when the second amount of brake force or brake torque is applied.

Variation 11 may include a method as set forth in variation 6 wherein the second amount of brake force or brake torque reduces the amount of torque a driver must use to steer the vehicle when the component has failed.

Variation 12 may include a method as set forth in variation 1 wherein the component is in a steering system.

Variation 13 may include a method as set forth in variation 1 wherein the component is a steering system power assist.

Variation 14 may include a method as set forth in variation 1 wherein the component is a roadwheel actuator.

Variation 15 may include a method as set forth in variation 12 wherein steering system is mechanical and the vehicle is constructed and arrange to be steered by a person.

Variation 16 may include a method as set forth in variation 1 wherein is constructed and arranged to be driven in a semi-autonomous manner.

Variation 17 may include a method as set forth in variation 1 wherein the vehicle is constructed and arranged to be driven autonomously.

The above description of select variations within the scope of the invention is merely illustrative in nature and, thus, variations or variants thereof are not to be regarded as a departure from the spirit and scope of the invention.

What is claimed is:

1. A method comprising monitoring a state of health of a steering system of a vehicle using one or more sensors, and wherein the state of health of the steering system ranges from completely healthy to complete failure, and determining that the state of health of the steering system is at least one of less than completely healthy, at risk of partial failure, or at risk of complete failure, and thereafter pre-charging the braking system to reduce hysteresis or lag time to apply braking force or brake torque to a brake disc or drum connected to a wheel of the vehicle, and thereafter communicating brake force or torque requests to the wheel of the vehicle as a function of driver steering inputs including steering angle, steering angle rate, or steering torque.

2. A method comprising determining state of health of the steering system power assist of a vehicle using one or more sensors, the steering system power assist being constructed and arranged to rotate a steering shaft connected to a driver interface to assist a driver in steering a vehicle using the driver interface with less torque then if the power assist were not present, determining that the steering system power assist is at risk of failure, and thereafter pre-charging the brake system including moving at least one brake pad from a first position spaced a first distance from a brake disc or brake drum to a second position wherein the brake pad is at a closer position to the brake disc or brake drum than the first position or the brake pad is engaging the brake disc or brake drum to reduce lag time in applying sufficient force to at least one brake disc or brake drum in the event of a failure of a component in the steering system, and thereafter determining that the steering system power assist has failed, and thereafter using the at least one brake pad to apply a sufficient braking force to the brake disc or brake drum to reduce the torque the driver would have to use to steer the vehicle when the power assist has failed and the sufficient braking force has not been applied.

3. A method comprising:

monitoring a steering system of a vehicle to using at least one senor, and determining that a component of the steering system is at risk of failing, then causing the steering system to communicate to an electronic brake system that the component of the steering system is at risk of failing: the brake system thereafter preparing to support the steering system by building a first amount of brake force or brake torque of a brake disc or brake drum of the vehicle using a first brake caliper, wherein the amount of brake force or brake torque pre-charges the first caliper but is not enough to provide distinguishable deceleration of the vehicle to a driver; requesting a vehicle transmission to downshift; thereafter determining that the component of the steering system has failed and thereafter the brake system building a second amount of brake force or brake torque on the brake disc or brake drum.

4. A method as set forth in claim 3 wherein the component is a steering system power assist.

5. A method as set forth in claim 3 wherein the component is a roadwheel actuator.

6. A method as set forth in claim 3 further comprising determining that the vehicle is moving along a curved path at the time that a component of the steering system has failed wherein the second amount of brake force or brake torque is applied to the disc brake or brake drum of a vehicle a wheel on the inside of the curve path with the amount based upon the steering angle or the last known steering angle.

7. A method as set forth in claim 3 further comprising the brake system requesting additional engine or motor torque when the second amount of brake force or brake torque is applied.

8. A method as set forth in claim 3 wherein the second amount of brake force or brake torque reduces the amount of torque a driver must use to steer the vehicle when the component has failed.

* * * * *